N. P. & N. E. Allen,
Anchor.

No. 110,329.  Patented Dec. 20, 1870.

Witnesses
S. N. Piper
J. R. Snow

N. P. & N. E. Allen
by their attorney
R. H. Eddy

United States Patent Office.

NATHANIEL P. ALLEN AND NATHANIEL E. ALLEN, OF SALEM, MASSACHUSETTS.

Letters Patent No. 110,329, dated December 20, 1870; antedated December 7, 1870.

IMPROVEMENT IN GRAPNELS.

The Schedule referred to in these Letters Patent and making part of the same.

*To all persons to whom these presents may come:*

Be it known that we, NATHANIEL P. ALLEN and NATHANIEL E. ALLEN, of Salem, of the county of Essex and State of Massachusetts, have invented an Improved Grapnel, to be used for catching up ropes, chains, or cables when sunk upon the bottom of the sea or body of water; and we do hereby declare the same to be fully described as follows, reference being had to the accompanying drawing, of which—

Figure 1:

Figure 1 denotes a top view, and

Figure 2:
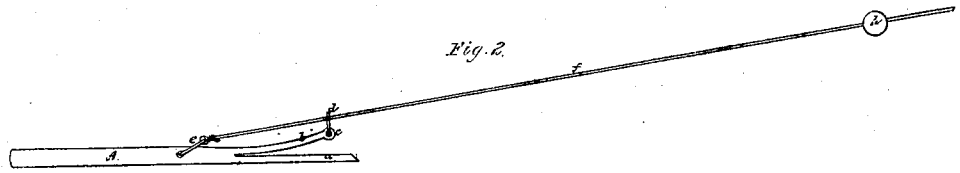

Figure 2, a side elevation of the grapnel apparatus to be hereinafter explained.

In such drawing—

A denotes a heavy shank or long weight, provided with two ground-prongs, $a\ a$, extended from its front end at an acute angle from one another, and level, or about so, with the lower side of the shank.

An arm, or third or leading prong, $b$, is projected from the said end of the shank, and upward, with respect to the prongs $a\ a$, and from or near their junction, in manner as represented, this prong $b$ terminating in or having an eye, $c$, provided with a ring, $d$.

Another ring or staple, $e$, may be fixed to the shank just in rear of the prongs.

A line, $f$, fastened to the ring or staple $e$, is led through the ring $d$, a ball or weight, $h$, being fixed on or to the line at a short distance in advance of the grapnel.

The purpose of the said ball is to enable a seaman to know when the grapnel is fairly on the bottom of the sea without being obliged to lift the whole grapnel and "dump" it to determine as much.

In using the grapnel, it is to be dragged by its line with its prongs foremost on the bottom of the sea, lake, or river, or body of water from which it may be desirable to catch or "pick up" a rope or cable.

On the grapnel taking the rope or cable, the latter will be drawn between the upper or leading prong and the two ground-prongs, and be caught thereby by being wedged between them.

As the leading prong is somewhat shorter than either of the ground-prongs, should either or both the latter be brought up against an obstacle, the grapnel will be easily tripped or thrown over it by the action of the draft-line.

We claim—

1. The improved grapnel, as composed of the long weight or arm A, the ground-prongs $a\ a$, and the leading prong $b$, arranged together as specified.

2. The combination and arrangement of the sounding-weight $h$ with the line $f$ and the grapnel composed of the long weight or arm A, the ground-prongs $a\ a$, and the leading-prong $b$, arranged as described.

NATHL. P. ALLEN.
NATHL. E. ALLEN.

Witnesses:
R. H. EDDY,
J. R. SNOW.